United States Patent [19]

Kangas

[11] Patent Number: 4,901,322
[45] Date of Patent: Feb. 13, 1990

[54] TUNABLE PULSED SINGLE LONGITUDINAL MODE LASER OSCILLATOR

[75] Inventor: Kenneth W. Kangas, Bellevue, Wash.

[73] Assignee: Spectra-Physics, Inc., San Jose, Calif.

[21] Appl. No.: 214,419

[22] Filed: Jul. 1, 1988

[51] Int. Cl.$^4$ ............................................. H01S 3/10
[52] U.S. Cl. ........................................ 372/20; 372/102
[58] Field of Search ...................... 372/20, 19, 102, 108

[56] References Cited

U.S. PATENT DOCUMENTS

| | | | |
|---|---|---|---|
| 3,833,862 | 9/1974 | Wickersheim et al. | 372/41 |
| 4,167,712 | 9/1979 | Esterowitz et al. | 372/41 |
| 4,229,710 | 10/1980 | Shoshan | 372/20 |

OTHER PUBLICATIONS

W. A. Hardy et al., "Tunable Solid State Laser", *IBM Technical Disclosure Bulletin*, vol. 6, No. 8, Jan. 1964, pp. 66–67.

*Primary Examiner*—James W. Davie
*Attorney, Agent, or Firm*—Seed and Berry

[57] ABSTRACT

A laser system for producing pulsed, single longitudinal mode optical energy over a widely tunable range of wavelengths. The system includes an optical cavity and a solid-state gain medium. The optical cavity comprises first, second, and third optical element means. The first optical element means reflects energy received along a reflective optical path and directs the energy toward the second optical element means, which diffracts the optical energy onto a diffraction axis and an output axis. The energy diffracted along the diffraction axis is reflected back toward the second optical element means by a third optical element means, thereby creating a resonant optical cavity. The solid-state gain medium is located on the optical axis between the first and second optical element means and receives optical energy from a pump beam that is within two degrees of being colinear with the reflective optical path. The solid-state gain medium converts the pump beam energy to optical energy having a desires wavelength with a very high efficiency. The laser system is tunable by moving the third optical element means with respect to the second optical element means, thereby causing optical energy at a tunable wavelengh to resonate within the optical cavity.

19 Claims, 3 Drawing Sheets

TUNABLE PULSED SINGLE LONGITUDINAL MODE LASER OSCILLATOR

TECHNICAL FIELD

This invention relates to pulsed lasers, and more particularly, to pulsed lasers that produce single longitudinal mode energy over a wide range of wavelengths.

BACKGROUND ART

Tunable pulsed lasers using dye cells as the gain medium and diffraction gratings as the wavelength-selective element have been available since the early 1970s. These early lasers, however, had relatively broad linewidths, poor temporal and spatial beam properties and produced relatively low powers and/or energies In addition, these early lasers had relatively many parts and were difficult to align.

It was also discovered that mode-hopping and mode-beating of these tunable pulsed lasers occurred as the laser was tuned over its entire tuning range. Since output beams that exhibit mode-beating can cause undesirable responses in the materials into which they are introduced, a single longitudinal mode is to be preferred.

It is known that continuous-wave (CW) lasers can operate with very narrow bandwidths. However, to produce pulsed outputs from such lasers, it is necessary to pulse amplify the CW output into the desired pulses. The process of amplifying the output is inefficient and requires complicated circuitry.

Further, it has long been known that gain mediums based on dye cells are relatively short lived.

It is therefore desirable to have a simple pulsed laser that can produce tunable single-mode outputs over a very broad range of wavelengths at moderate powers for long periods of time.

DISCLOSURE OF THE INVENTION

It is an object of the present invention to provide a laser that can be tuned over a very broad range of wavelengths.

It is another object of the present invention to provide a laser that can produce an output in a single longitudinal mode over its entire range of wavelengths.

It is yet another object of the present invention to provide a tunable pulsed laser that can operate at greater power outputs than previously attained.

It is a still further object of the present invention to provide a pulsed laser having a durable gain medium.

An additional object of the present invention is to provide a pulsed laser whose gain medium requires little or no maintenance.

According to one aspect, the invention provides a tunable pulsed laser oscillator that comprises an optical cavity and a solid-state gain medium. The optical cavity includes first, second, and third optical element means. The first optical element means receives optical energy along a reflective optical path and reflects the optical energy back along the reflective optical path. The second optical element means diffracts a first portion of the optical energy onto a diffraction axis and a second portion of the optical energy onto an output axis. The third optical element means reflects the optical energy received along the diffraction axis back along the diffraction axis. The solid-state gain medium is located along the reflective optical path between the first optical element means and the second optical element means. The gain medium produces a pulse of optical energy in a substantially single longitudinal mode along the reflective optical path in response to the receipt of a pump beam of energy.

In a preferred embodiment, the third optical element means is movable with respect to the second optical element means, thereby allowing the optical cavity to resonate at a tunable wavelength.

BEST MODES FOR CARRYING OUT THE INVENTION

Figure 1:
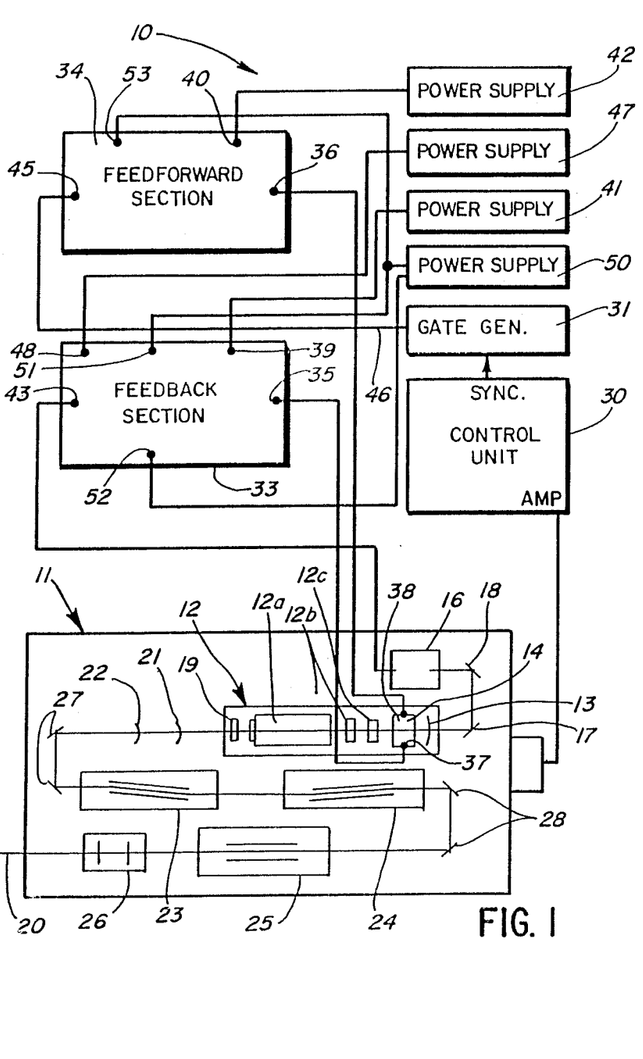
FIG. 1 is schematic diagram of a first embodiment of the present invention.

FIG. 1 is a schematic diagram of a first embodiment of the laser oscillator of the present invention. The laser oscillator comprises an optical cavity, generally referred to by numeral 10, including a first optical element 12, such as a back cavity mirror; a second optical element 14, such as a glancing incidence grating; and a third optical element 16, such as a grating feedback mirror. The laser oscillator also includes a solid-state gain medium 18, which may be a crystalline gain medium such as a titanium:sapphire (Ti:S) crystal.

Figure 5:
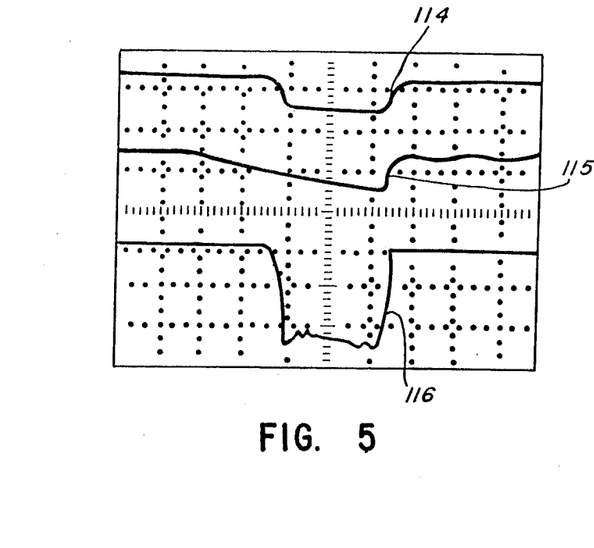
FIG. 5 is schematic diagram of a second embodiment of the present invention.

The first optical element 12 is placed along a first reflective optical path 20. The optical path 20 may be a single axis (as shown in FIG. 1) or a more complicated path (as shown in FIG. 5). The first optical element 12 receives and reflects back optical energy along the first reflective optical path 20. A highly reflective mirror is appropriate for use as the first optical element 12.

The second optical element 14 diffracts optical energy directed along the first reflective optical path 20. A first portion of the optical energy contained in the laser oscillator is diffracted along a diffraction axis 22 is diffracted by the first order of interference. A second portion of the optical energy is reflected along an output axis 24, is reflected out of the laser oscillator at glancing incidence. The distinct direction of the diffraction axis 22 is determined both by the angle at which the optical energy is directed toward the second optical element means 14 along the first reflective optical path 20 and the wavelength of the optical energy.

The third optical element 16 receives and reflects back optical energy along the diffraction axis 22.

The optical cavity 10 accordingly includes a first path consisting of the first reflective optical path 20 (between first and second optical elements 12 and 14) and the first order diffraction axis 22 (between second and third optical elements 14 and 16). The first path resonates at a wavelength which depends on the path's length. The optical cavity 10 also includes an output energy path consisting of the axes 20 and 24. The wavelength of the optical energy on the output path also depends upon the length of the first path.

The solid-state gain medium 18 is located along the first reflective optical path 20, between the first and second optical elements 12 and 14, and receives energy from a pump beam 25 along a pump beam axis 26 (See FIG. 1). In response to receiving the pump beam 25, the solid-state gain medium 18 produces optical energy along the first reflective optical path 20 at a desired wavelength.

The solid-state gain medium 18 is preferably a crystalline block of titanium:sapphire, which in the present invention, measures approximately 2 centimeters long in the direction of the first reflective optical path 20 and approximately 1 centimeter each in width and height in a plane perpendicular to the first reflective optical path 20.

Although titanium:sapphire crystal has been found to be particularly effective as a solid-state gain medium, other solid-state materials, such as neodymium:YAG and chromium-based crystals, will also work as the gain medium 18. Solid-state gain mediums are particularly advantageous because of one or more of the following: their wider tunability, narrow line widths, and longer lives as compared to dye gain mediums.

The efficiency of the solid-state gain medium 18 in converting the pump beam energy into optical energy at the desired wavelength is affected by the angle A (see FIG. 1) between the pump beam axis 26 and the first reflective optical path 20. The closer these axes are to being parallel, the greater the efficiency of conversion of the pump beam energy into optical energy. The angle A between the pump beam axis 26 and the first reflective optical path 20 is less than approximately 2 degrees. It has been found that whereas in a tunable dye laser, the output energy is a few microJoules, in an equivalent titanium:sapphire gain medium laser, the output is a few milliJoules.

The pump beam 25, which impinges upon the solid-state gain medium 18 along the pump beam axis 26, can be produced by a source (not shown), such as a Nd:YAG laser which operates at 1064 nanometers. Through the use of nonlinear optics, the output of the neodymium:YAG laser is doubled to a wavelength of 532 nanometers, which is within the approximate 480 to 540 nanometer absorption range of the titanium:sapphire crystal. Other pump beams, which are closer to the peak absorption of the titanium:sapphire crystal used for the solid-state gain medium 18 (i.e., at approximately 500 nanometers) can be used to further improve the efficiency of the laser oscillator.

The configuration of the present invention has significant outcoupling and cavity losses. These losses require pumping of the titanium:sapphire crystal and can be reduced by using an appropriate pump beam 25. With intense beams having the potential of causing optical damage, it has been found that a pump beam 25 which allows the use of a pulse train to lower peak energies offers the least potential for optical damage. Specifically, increasing the length of the pulse train which creates the pump beam 25 from a few nanoseconds to a few hundred nanoseconds is very effective at improving the life of the solid-state gain medium 18, by reducing, the potential for optical damage. For example, the laser pump beam energy can be supplied in a 250-nanosecond mode-locked Gaussian-shaped pulse train consisting of 100-picosecond pulses spaced 10 nanoseconds apart and producing approximately 50 milliJoules at 532 nanometers wavelength. The pulse train was amplified in a Spectra Physics DCR-2A Nd:YAG laser. With this level of pump beam energy, the laser oscillator has been operated to generate between 1 and 2 milliJoules per pulse of single longitudinal mode output energy having a pulse length of 2 to 3 nanoseconds. In a second experiment, the output from an injection seeded, single longitudinal mode Q-switched Spectra Physics DCR-3A is doubled and used directly to pump the Ti:S crystal. In this case, the pump pulse is approximately 5 nanoseconds in duration. The pumping was achieved by focusing the 0.4 centimeter 532 nanometer wavelength beam with a 50 centimeter focal length lens. The pump beam focus occurred near the diffractive element 14. For both pumping geometries, the pump beam diameter in the Ti:S was about 1.2 millimeters, giving a peak pump fluence of up to about 3.5 Joules/cm$^2$ with 40 milliJoules of pump energy.

The laser oscillator of the present invention can be continuously tuned by rotating the third optical element 16 with respect to the second optical element 14 about an axis 32 that is perpendicular to the plane of FIG. 1. This causes the wavelength of the resonant optical energy along the resonant path to change in accordance with the wavelength of the diffracted first order of the grating which is, in turn, reflected by the third optical element 16. If the gain medium 18 is a Ti:S crystal, tuning from 700 to 900 nanometers requires a total mirror rotation of 15 degrees. One location of the axis 32, which gives synchronous tuning without mode-hops, is described in "Grazing Incidence Designs Improve Pulsed Dye Lasers," Laser Focus 24, pp. 70–86 (Feb. 1988), by M. Littman and J. Montgomery. Using this location, exact tracking of the cavity length and wavelength should be possible, and continuous single longitudinal mode operation over a limited bandwidth should be achieved.

In an experiment where the tuning bandwidth was limited by the optical response of available optics, the laser oscillator was found to be continuously tunable over greater than 2500 cm$^{-1}$ from 746 to 918 nanometers. With optics coated to operate over a range of wavelengths between 700 and 1000 nanometers, tuning is expected over this wavelength range. The laser oscillator produced 2 nanosecond pulses, with 2.0 milliJoules per pulse, with a single longitudinal mode output. Its intrinsic efficiency was approximately 10 percent. This, with its output beam quality near TEM$_{00}$, makes this laser oscillator attractive for doubling and mixing applications. The higher energy is due to the must higher saturation fluence level in Ti:S as compared to dyes.

In the experiment, the Ti:S crystal was made from a boule purchased from Union Carbide several years ago. Consequently, its characteristics are not nearly as good as those that are obtainable at present. The material used had a pump absorption at 532 nanometers of 1 cm$^{-1}$ and a figure of merit of only approximately 15. This corresponds to an absorption loss of about 0.07 cm$^{-1}$ at 800 nanometers. Surface reflections were minimized with a hard antireflection coating at 800 nanometers. Both the back cavity mirror 12 and the tuning mirror 16 were dielectric coated for maximum reflection in the near infrared wavelengths around 800 nanometers.

Certain gain media, for example, a solid-state gain medium 18, can be used in the laser oscillator to produce an output exhibiting a single longitudinal mode. In particular, the choice of a crystalline gain medium, such as a Ti:S crystal having an optical axis 36, and causing the pump beam 25 to be polarized (as indicated by polarization arrows 38) in a direction parallel to the crystal's optical axis 36, will cause the gain medium 18 to generate optical energy having substantially a single polarization. This promotes the existence of a single longitudinal mode. This was demonstrated by examining the output of the laser oscillator after its wavelength had been doubled. Using a Hamamatsu SbCs detector and a 10 GHz etalon with a finesse of 25, the presence of a single longitudinal mode could be demonstrated from the temporal output shape and ring structure.

Figure 2:
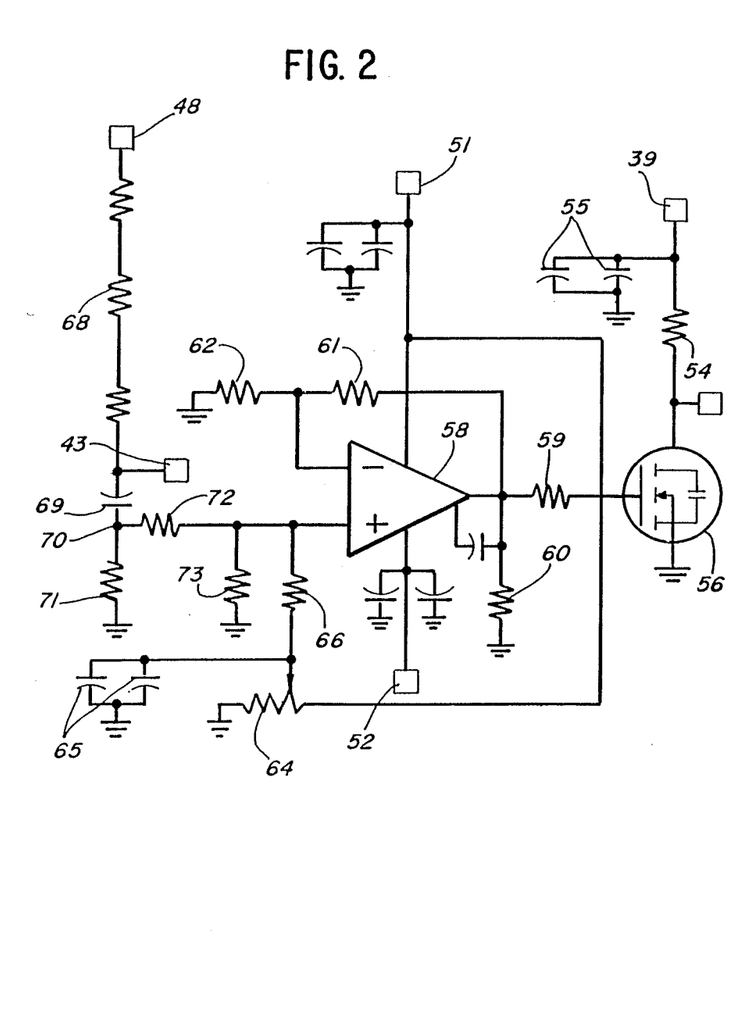
FIG. 2A is a graph of the temporal response of a laser system which is producing energy in two longitudinal modes.
FIG. 2B is a photograph of the etalon output of a laser system which is producing energy in two longitudinal modes.
Figure 2A:
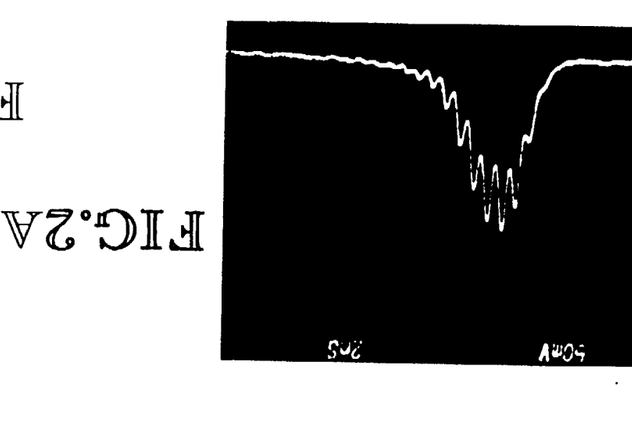
Figure 2B:
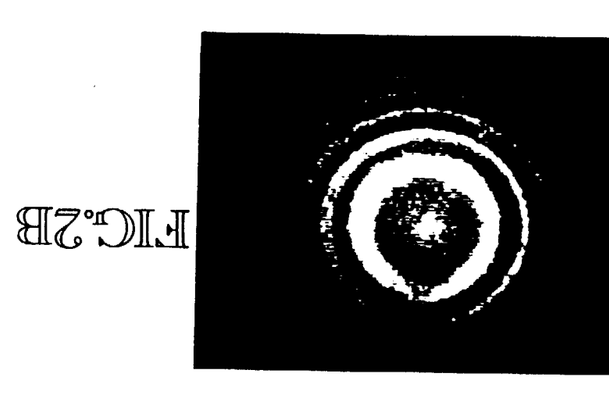

The graph of FIG. 2A and the photograph of FIG. 2B show the temporal response and etalon output of the laser oscillator where the angle of the second optical element 14 is not set to produce a glancing condition between the first reflective optical path 20 and the output axis 24. In addition, the cavity length, which was 12 centimeters, was not optimized. The result is that the temporal response (shown in FIG. 2A exhibits oscillatory behavior characteristic of mixed mode operation. This is confirmed by the etalon output (shown in FIG. 2B), which exhibits double-ringed structures.

Figure 3:
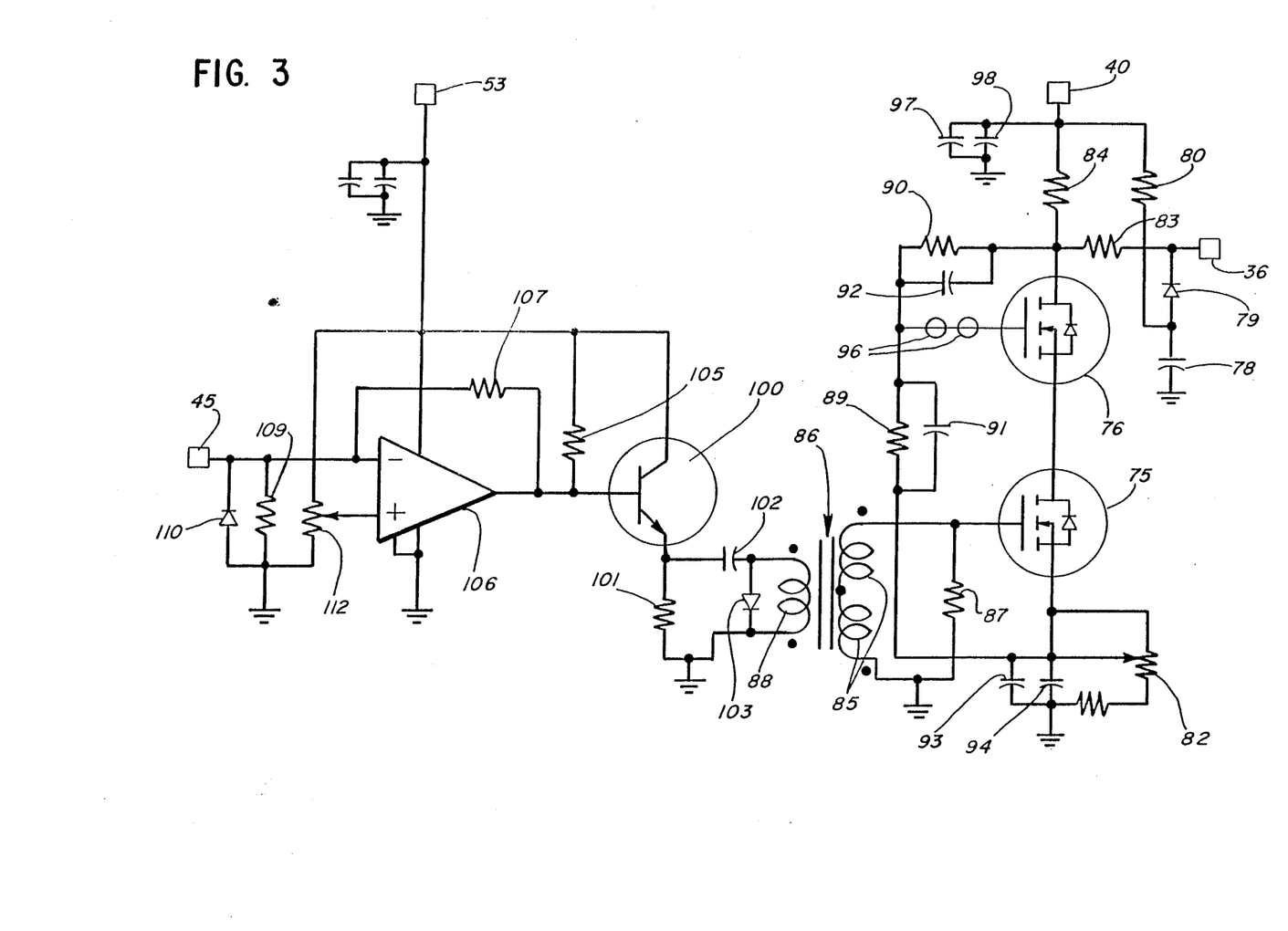
FIG. 3A is a graph of the temporal response of a laser system which is producing energy in a single longitudinal mode.
FIG. 3B is a photograph of the etalon output of a laser system which is producing energy in a singe longitudinal mode.
Figure 3A:
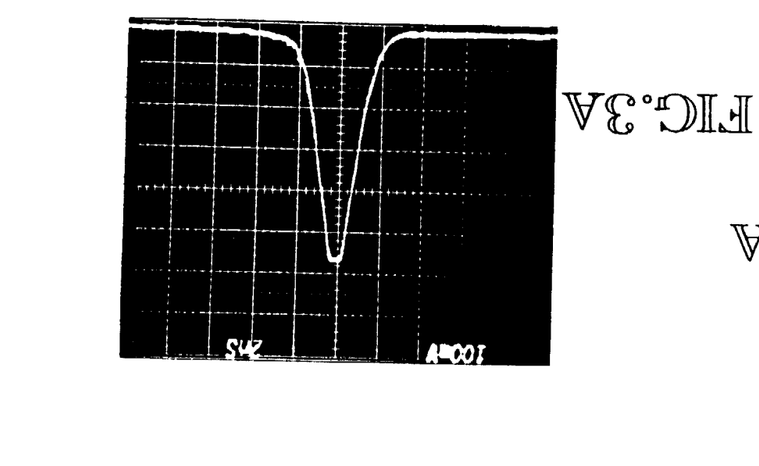
Figure 3B:
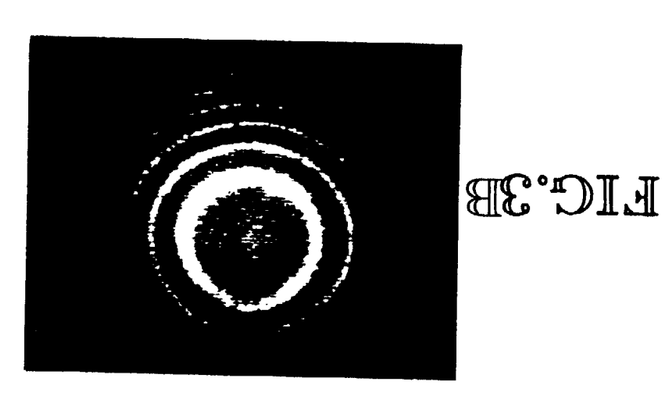

When the grating angle is set closer to a glancing condition and the cavity shortened to about 6 centimeters, the temporal response and ring structures of the output are improved significantly. As shown in the graph of FIG. 3A and the photograph of FIG. 3B, the temporal output exhibits no mode beating and the etalon output (shown in FIG. 3B) exhibits only single-ring structures, indicating single longitudinal mode operation. With the burst of mode locked pulses as the pump beam, the threshold for single longitudinal mode oscillation was approximately 18 milliJoules. Above 40 milliJoules, single longitudinal mode operation ceased.

Single longitudinal mode operation is limited to a narrow range of conditions, which can be predicted using geometrical ray tracing and Gaussian beam propagation concepts. This analysis assumes that the laser oscillator is tuned to a wavelength $\lambda$, so that oscillation occurs along the path 20. For any other wavelength $\lambda' = \lambda + \delta\lambda$, the oscillation follows a different path than path 20, due to the dispersion of the optical element 14. This produces walk-off within the gain region of the gain medium 18—by an amount $\delta x$ on each round trip in the oscillator. Consequently, those rays which move across the gain region in the gain medium 18 experience lower total gain after N round trips, as opposed to rays at the tuned wavelength $\lambda$. The output intensity after N round trips can be defined as I at wavelength $\lambda$ and as I' at wavelength $\lambda'$. Both intensities are initiated from spontaneous emission in the gain medium 18. The ratio I'/I is a measure of the mode fidelity when $\Delta\lambda$ is taken as the longitudinal mode spacing $\lambda^2/2(L_1+L_2)$, where $L_1$ and $L_2$ make up the total cavity length.

By assuming a spatial gain distribution of width 2x and computing I' and I after each round trip in the cavity, the values of I'/I were predicted. The ratio I'/I is evaluated when the intensity I reaches output flux level (50 mW/cm² for a gain switched oscillator). Values of I'/I less than or equal to 0.05 are taken as sufficient to assure essentially single longitudinal mode operation. For a parabolic gain distribution (taken for convenience), the output intensity ratio after N round trips is approximately $$\log\left(\frac{I'}{I_{start}}\right) \approx \left[N(1-\gamma) + \frac{\gamma}{3}N^2(N-1)\left(\frac{\delta x}{x}\right)^2\right]\log(R),$$

where I' becomes I when $\delta x = 0$. The ratio of gain to threshold gain is designated by $\gamma$ and the output coupling reflectivity by R. While $\delta x$ is different for each round trip in the oscillator and, accordingly, the beam walks off both the gain region of the gain medium 18 and the diffractive optical element 14, for only 5 to 10 round trips, an average value of $\delta x$ can be related to the cavity length, grazing angle of incidence, wavelength, and grating period for cases where the feedback optical element 16 and the diffraction optical element 14 are approximately parallel. This expression (for $\delta x$ measured in millimeters) is:

$$\delta x(mm) = \frac{0.23 \lambda^2(\mu)}{\alpha(deg)d(\mu)}\left[\frac{L_2/L_1}{1+L_2/L_1}\right]$$

Here $\alpha$ is the grazing angle in degrees, and d is the grating period in microns. Clearly $\delta x$ must be as large as possible to reduce the ratio I'/I and to guarantee single longitudinal mode operation. This requires that $\alpha$ and d are small, and the ratio of length $(L_2/L_1)$ must be greater than 1. In a current design, $L_2/L_1$ equals 6, with $L_1 = 1$ centimeter. Clearly, $L_2$ cannot be arbitrarily large due to diffraction effects.

Figure 4:
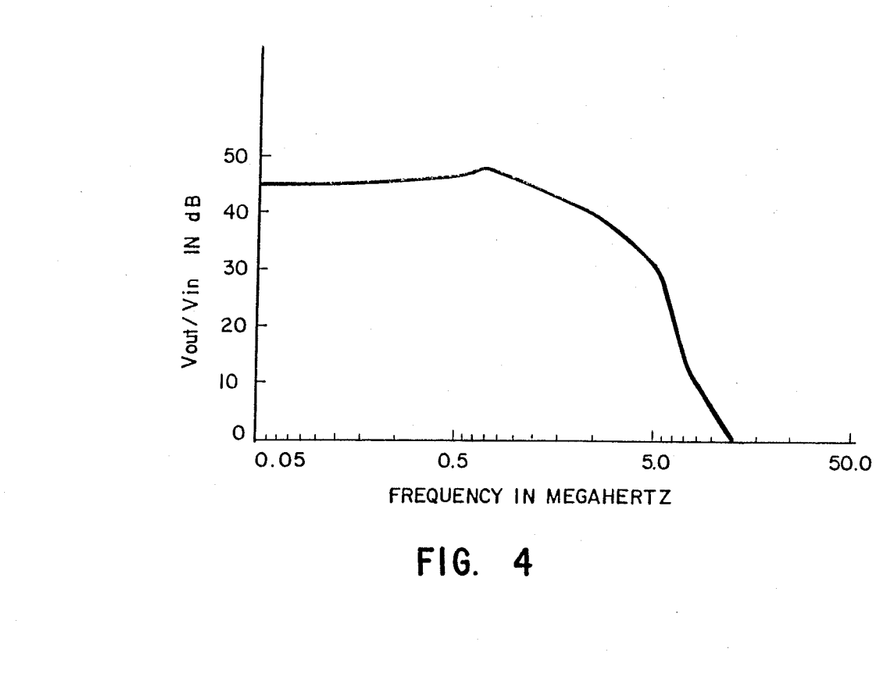
FIG. 4 is a graph of mode fidelity of the laser oscillator of the present invention as a function of fractional walk-off.

Typical values ($\alpha = 1.5$ degrees, $\lambda = 0.8$ microns) lead to $\delta x = 0.1$ to 0.15 millimeters for gratings with 1200–1800 lines per millimeter, respectively. Each curve shown in the graph of FIG. 4 is for a different gain, $\gamma$, and number of cavity round trips to reach output intensities. The results show a very limited range of gain and $(\delta x/x)$ over which single longitudinal mode operation is possible. Increasing the gain requires large values of $(\delta x/x)$ to maintain the same mode fidelity and lowering the gain below twice threshold leads to unstable operation.

Further, diffraction limits the maximum value of $L_2$ and $(\delta x/x)$. For example, the diffraction-induced angular ray errors after N cavity round trips $\beta_N$ must be less than the angular shifts $\delta\alpha$ induced by the diffraction optical element 14 for adjacent longitudinal modes. The diffraction-induced angular errors can be estimated using the Gaussian beam propagation equation. For a beam within its Rayleigh range, the angular ray errors are given by the approximate relationship $$\beta_N \approx 2(L_1+L_2)\lambda^2 N/\pi^2 x^3.$$

From the cavity geometrical ray tracing it can be shown that $$\Delta\alpha \approx \Delta\lambda/\alpha d = \lambda^2/2\alpha d(L_1+L_2).$$

Setting $\beta_N$ less than $\delta\alpha$ gives the upper limit on $L_2$ as $$(L_1+L_2) \leq \frac{\pi}{2}\frac{x^{3/2}}{(d\alpha N)^{1/2}}$$

This result can be combined with the walk-off expression above to set an upper bound on (δx/x) of $$\left(\frac{\delta x}{x}\right) \leq \frac{2.6\ \lambda^2(\mu)}{N^{1/3}} \left(\frac{1}{[\alpha(\deg)d(\mu)]^4} \cdot \frac{L_2^3}{[L_1+L_2]^5}\right)^{1/3}.$$

For the conditions required for the oscillator to work as desired, (δx/x) must be less than approximately 0.15 when $L_2=6$ centimeters. For larger values of $L_2$, the limit is even lower. This occurs because x must be increase as the cavity length grows in order to minimize diffraction spreading.

The combined effects of diffraction (forcing a larger beam size) and beam walkoff restricts the beam diameter. This beam size restriction, coupled with a saturation fluence for Ti:S limit the single longitudinal mode oscillator output to approximately 1-10 milliJoules. Other solid state materials will have different limits. Additionally, the damage fluence for Ti:S, approximately 5 to 10 $J/cm^2$ for laser pumping, sets a limit on the gain, as shown in FIG. 4.

It is important to note that other solid state materials, such as alexandrite and Nd:xxx may also be used in this oscillator configuration. However, gain-length products greater than 2 must be achievable in order to sustain oscillation with the high output coupling of the grazing incidence grating.

Other embodiments of the present invention are also possible. These embodiments can be directed toward further improving the efficiency of the solid-state gain medium 18 by causing the pump and the first reflective optical path 20 to be essentially colinear. As shown in the schematic diagram of FIG. 5, such an embodiment can consist of the same components as described for the embodiment of FIG. 1. There are two major differences between the embodiments of FIGS. 1 and 5. One difference is that the pump beam energy for the laser oscillator shown in FIG. 5 reaches the solid-state gain medium 18 (by passing through the first optical element 12) along a pump beam axis 30, which is coincident with the first reflective optical path 20. The energy from the pump beam passes through the first optical element 12 into the solid-state gain medium 18, where it generates optical energy at the desired wavelength but at a higher efficiency. The other major difference is that the gain medium 18 is a solid-state material oriented to have two Brewster faces 50 and 52, whose angles depend upon the index of refraction of the material making up the gain medium 18, in accordance with the well-known Brewster angle relationship. As shown in FIG. 5, the angle 54 is approximately 30 degrees, while the angle 56, between the normal to the face 50 and the optical path 20 is approximately 60 degrees.

Figure 6:
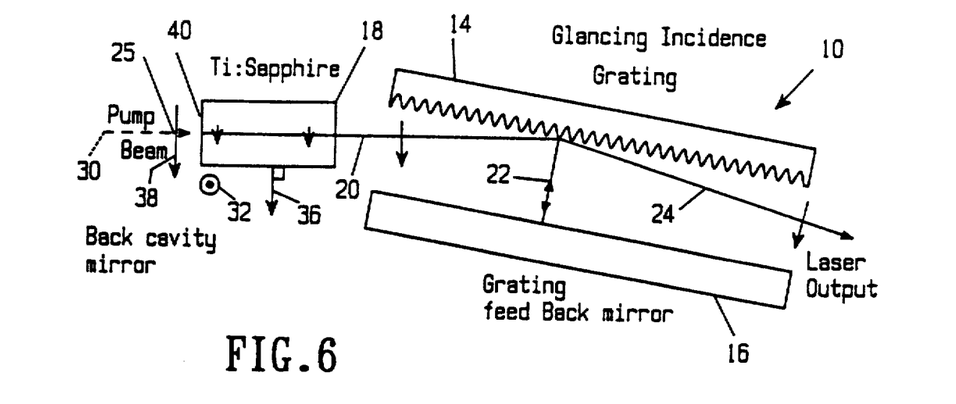
FIG. 6 is schematic diagram of a third embodiment of the present invention.

A third embodiment of the present invention is shown in FIG. 6. In this oscillator, the first optical element 12 takes the form of a reflective coating 40 (such as a dichroic coating) on the surface of the solid-state gain medium 18 that defines an outer end of the optical cavity 10 along the first reflective optical path 20.

As indicated above, detailed illustrative embodiments are disclosed herein. However, other laser oscillators, which may be detailed rather differently from the disclosed embodiments, are possible. Consequently, the specific structural and functional details disclosed herein are merely representative; yet in that regard they are deemed to afford the best embodiments for purposes of disclosure and to provide a basis for the claims herein, which define the scope of the present invention.

I claim:

1. A tunable pulsed single longitudinal mode laser oscillator, comprising:
    an optical cavity having a predetermined length, including
        first optical element means for receiving optical energy along a reflective optical path and for reflecting said optical energy back along said reflective optical path, said reflective optical path having a reflective path length,
        second optical element means for diffracting a first portion of said optical energy onto a diffraction axis and a second portion of said optical energy onto an output axis, said diffraction axis having a diffraction axis path length, the predetermined length of said optical cavity being equal to the sum of the reflective path length and the diffraction axis path length and being sufficiently short to sustain optical energy having substantially only a single longitudinal mode along said reflective optical path, and
        third optical element means for reflecting optical energy received along said diffraction axis back along said diffraction axis; and
    a solid-state gain medium located along said reflective optical path between said first optical element means and said second optical element means, said gain medium producing a pulse of optical energy in a substantially single longitudinal mode along said reflective optical path in response to the receipt of a pump beam of energy.

2. The tunable pulsed laser oscillator of claim 1 wherein said third optical element means is movable with respect to said second optical element means, thereby allowing said optical cavity to resonate at a tunable wavelength.

3. A tunable pulsed single longitudinal mode laser oscillator for producing optical energy at a predetermined wavelength, comprising:
    an optical cavity having a predetermined length, including:
        first optical element means for receiving optical energy along a reflective optical path, said reflective optical path having a reflective path length, and for reflecting said optical energy along said reflective optical path,
        second optical element means for diffracting a first portion of said optical energy onto a diffraction axis and a second portion of said optical energy onto an output axis, said diffraction axis having a diffraction axis path length, the predetermined length of said optical cavity being equal to the sum of the reflective path length and the diffraction axis path length and being sufficiently short to sustain optical energy having substantially only a single longitudinal mode along said reflective optical path, and
        third optical element means for reflecting optical energy received along said diffraction axis back along said diffraction axis, said third optical element means being spaced apart from said second optical element means so that said optical cavity is resonant at said predetermined wavelength; and a crystalline gain medium located along said reflective optical path between said first optical element means and said second optical element means, said gain medium producing a pulse of optical energy in a substantially single longitudinal mode along said reflective optical path in response to the receipt of a pump beam of energy, said optical energy having said predetermined wavelength.

4. The tunable pulsed laser oscillator of claim 3 wherein said third optical element means is movable with respect to said second optical element means, thereby allowing said optical cavity to resonate at a tunable wavelength.

5. A tunable pulsed single longitudinal mode laser oscillator for producing optical energy at a predetermined wavelength, comprising:
   an optical cavity having a predetermined length, including:
      a back cavity mirror for receiving optical energy along a reflective optical path, said reflective optical path having a reflective path length, and for reflecting said optical energy along said reflective optical path,
      a glancing incidence grating for diffracting a first portion of said optical energy onto a diffraction axis and a second portion of said optical energy onto an output axis, said diffraction axis having a diffraction axis path length, the predetermined length of said optical cavity being equal to the sum of the reflective path length and the diffraction axis path length and being sufficiently short to sustain optical energy having substantially only a single longitudinal mode along said reflective optical path, and
      a feedback mirror for reflecting optical energy received along said diffraction axis back along said diffraction axis, said third optical element means being spaced apart from said second optical element means so that said optical cavity is resonant at said predetermined wavelength; and
   a solid-state gain medium located along said reflective optical path between said back cavity mirror and said glancing incidence grating, said gain medium producing a pulse of optical energy in a substantially single longitudinal mode along said reflective optical path in response to the receipt of a pump beam of energy, said optical energy having said predetermined wavelenghth.

6. The tunable pulsed laser oscillator of claim 5 wherein said back cavity mirror is partially transmissive and said pump beam passes into said gain medium through said back cavity mirror.

7. The tunable pulsed laser oscillator of claim 5 wherein said gain medium has first and second opposed sides, said reflective optical path intersecting said sides.

8. The tunable pulsed laser oscillator of claim 7 wherein said first and second opposed sides have antireflective coatings.

9. The tunable pulsed laser oscillator of claim 7 wherein said first and second opposed sides are substantially at Brewster's angle with respect to said reflective optical path.

10. A tunable pulsed single longitudinal mode laser oscillator for producing optical energy at a predetermined wavelength, comprising:
   a solid-state gain medium having first and second opposed sides and being capable of producing a pulse of optical energy in a substantially single longitudinal mode along a first optical path in response to the receipt of a pump beam of energy, said optical energy having said predetermined wavelength and said first optical path intersecting said first and second opposed sides;
   a back cavity mirror attached to said first opposed side and adapted to receive optical energy along a reflective optical path that passes through said second opposed side and intersects said first opposed side, said reflective optical path having a reflective path length, and to reflect said optical energy passing along said reflective optical axis and through said second opposed side;
   a glancing incidence grating for diffracting a first portion of said optical energy directed along said reflective optical path onto a diffraction axis and a second portion of said optical energy onto an output axis, said diffraction axis having a diffraction axis path length, the predetermined length of said optical cavity being equal to the sum of the reflective path length and the diffraction axis path length and being sufficiently short to sustain optical energy having substantially only a single longitudinal mode along said reflective optical path; and
   a feedback mirror for reflecting optical energy received along said diffraction axis back along said diffraction axis, said third optical element means being spaced apart from said second optical element means so that said optical cavity is resonant at said predetermined wavelength.

11. The tunable pulsed laser oscillator of claim 10 wherein said feedback mirror is movable with respect to said glancing incidence grating, thereby allowing said optical cavity to resonate at a tunable wavelength.

12. The tunable pulsed oscillator of claim 10 wherein said back cavity mirror is partially transmissive and said pump beam passes into said solid-state gain medium through said back cavity mirror.

13. The tunable pulsed laser oscillator of claim 10 wherein said first and second opposed sides have antireflective coatings.

14. The tunable pulsed laser oscillator of claim 10 wherein said first and second opposed sides are substantially at Brewster's angle with respect to said reflective optical path.

15. A tunable pulsed single longitudinal mode laser oscillator for producing optical energy at a predetermined wavelength, comprising:
   a crystalline gain medium having first and second opposed sides and being capable of producing a pulse of optical energy in a substantially single longitudinal mode along a first optical path in response to the receipt of a pump beam of energy, said optical energy having said predetermined wavelength and said first optical path intersecting said first and second opposed sides.
   a back cavity mirror attached to said first opposed side and adapted to receive optical energy along a reflective optical axis that passes through said second opposed side and intersects said first opposed side and to reflect said optical energy passing along said reflective optical axis and through said second opposed side;
   a glancing incidence grating for diffracting a first portion of said optical energy directed along said reflective optical path onto a diffraction axis and a second portion of said optical energy onto an output axis, said diffraction axis having a diffraction axis path length, the predetermined length of said optical cavity being equal to the sum of the reflective path length and the diffraction axis path length and being sufficiently short to sustain optical energy having substantially only a single longitudinal mode along said reflective optical path; and a feedback mirror for reflecting optical energy received along said diffraction axis back along said diffraction axis, said feedback mirror being movable along said diffraction axis to cause said optical cavity to be resonant at said predetermined wavelength.

16. The tunable pulsed laser oscillator of claim 15 wherein said feedback mirror is movable with respect to said glancing incidence grating, thereby allowing said optical cavity to resonate at a tunable wavelength.

17. The tunable pulsed laser oscillator of claim 15 wherein said back cavity mirror is partially transmissive and said pump beam passes into said crystalline gain medium through said back cavity mirror.

18. The tunable pulsed laser oscillator of claim 15 wherein said first and second opposed sides have antireflective coatings.

19. The tunable pulsed laser oscillator of claim 15 wherein said first and second opposed sides are substantially at Brewster's angle with respect to said reflective optical path.

* * * * *

UNITED STATES PATENT AND TRADEMARK OFFICE
CERTIFICATE OF CORRECTION

PATENT NO. : 4,901,322

DATED : February 13 1990

INVENTOR(S) : Kenneth W. Kangas

It is certified that error appears in the above-identified patent and that said Letters Patent is hereby corrected as shown below:

The title page has been deleted to appear as per attached title page.

Sheets 1-3 of the drawings should be replaced with sheets 1-3 of drawings, consisting of 8 figs., as shown on the attached pages.

In claim 10, column 10, lines 27-30, delete "third optical means being spaced apart from said second optical element means so that said optical cavity is" and substitute therefor --feedback mirror being movable along said diffraction axis to cause said optical cavity to be--.

Signed and Sealed this

Eighteenth Day of February, 1992

Attest:

HARRY F. MANBECK, JR.

*Attesting Officer*   *Commissioner of Patents and Trademarks*

United States Patent [19]

Kangas

[11] Patent Number: 4,901,322

[45] Date of Patent: Feb. 13, 1990

[54] TUNABLE PULSED SINGLE LONGITUDINAL MODE LASER OSCILLATOR

[75] Inventor: Kenneth W. Kangas, Bellevue, Wash.

[73] Assignee: Spectra-Physics, Inc., San Jose, Calif.

[21] Appl. No.: 214,419

[22] Filed: Jul. 1, 1988

[51] Int. Cl.⁴ .................................. H01S 3/10
[52] U.S. Cl. ............................ 372/20; 372/102
[58] Field of Search ............ 372/20, 19, 102, 108

[56] References Cited

U.S. PATENT DOCUMENTS

| | | | |
|---|---|---|---|
| 3,833,862 | 9/1974 | Wickersheim et al. | 372/41 |
| 4,167,712 | 9/1979 | Esterowitz et al. | 372/41 |
| 4,229,710 | 10/1980 | Shoshan | 372/20 |

OTHER PUBLICATIONS

W. A. Hardy et al., "Tunable Solid State Laser", *IBM Technical Disclosure Bulletin*, vol. 6, No. 8, Jan. 1964, pp. 66–67.

Primary Examiner—James W. Davie
Attorney, Agent, or Firm—Seed and Berry

[57] ABSTRACT

A laser system for producing pulsed, single longitudinal mode optical energy over a widely tunable range of wavelengths. The system includes an optical cavity and a solid-state gain medium. The optical cavity comprises first, second, and third optical element means. The first optical element means reflects energy received along a reflective optical path and directs the energy toward the second optical element means, which diffracts the optical energy onto a diffraction axis and an output axis. The energy diffracted along the diffraction axis is reflected back toward the second optical element means by a third optical element means, thereby creating a resonant optical cavity. The solid-state gain medium is located on the optical axis between the first and second optical element means and receives optical energy from a pump beam that is within two degrees of being colinear with the reflective optical path. The solid-state gain medium converts the pump beam energy to optical energy having a desires wavelength with a very high efficiency. The laser system is tunable by moving the third optical element means with respect to the second optical element means, thereby causing optical energy at a tunable wavelengh to resonate within the optical cavity.

19 Claims, 3 Drawing Sheets